Feb. 11, 1958 M. F. SCHMITZ, JR 2,823,366
ROTATING SIGNAL LIGHT
Filed Feb. 7, 1956 3 Sheets-Sheet 1
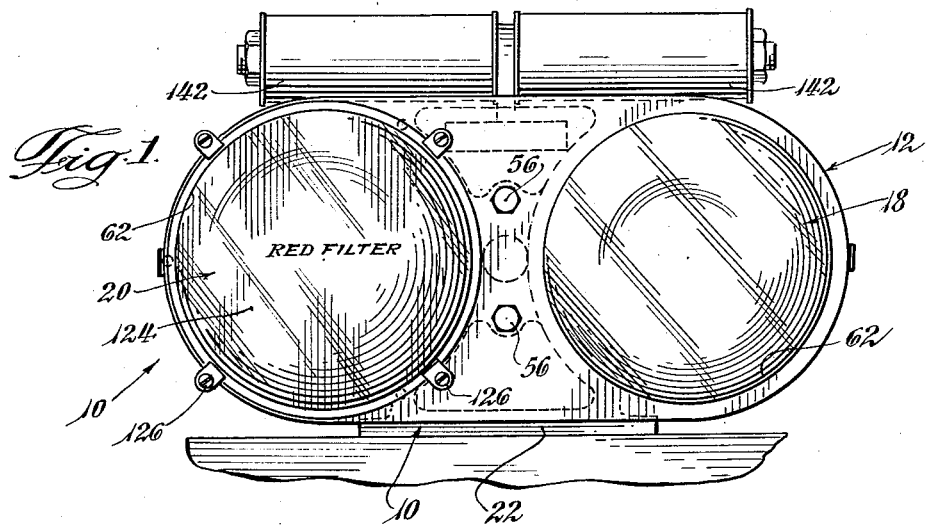
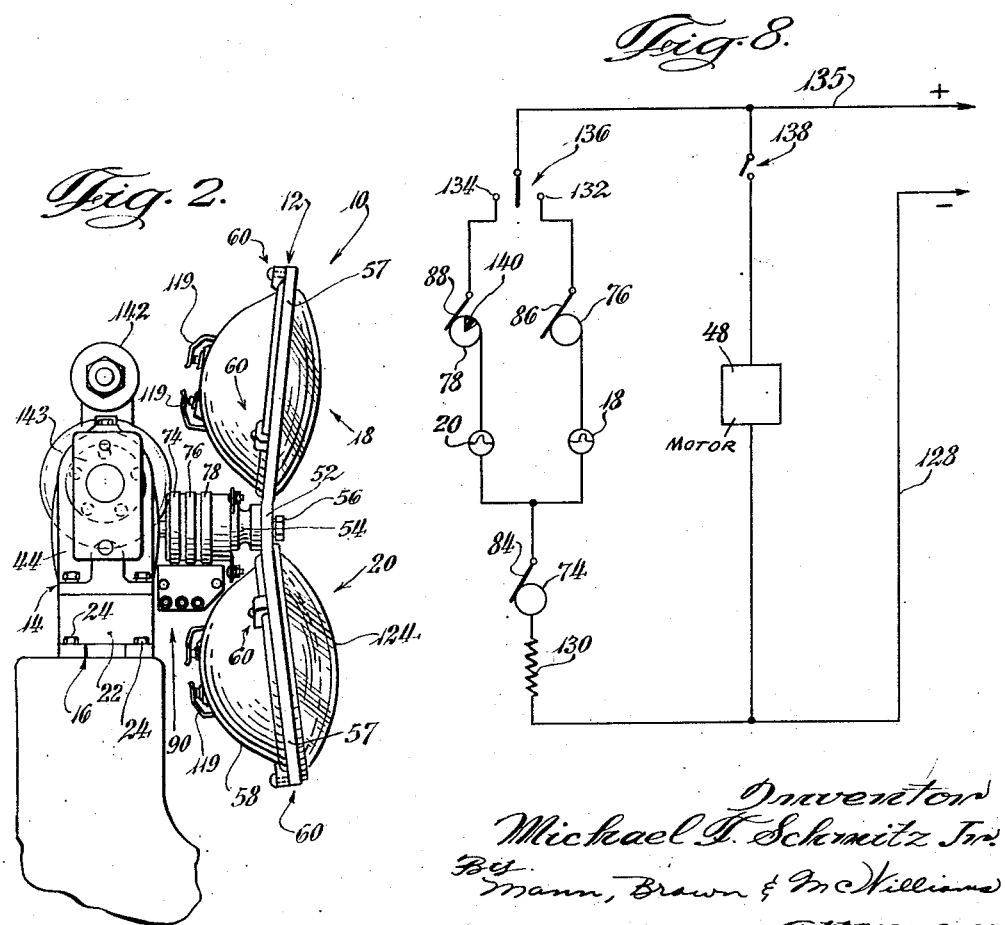
Inventor
Michael F. Schmitz Jr.
By Mann, Brown & McWilliams
Attorneys

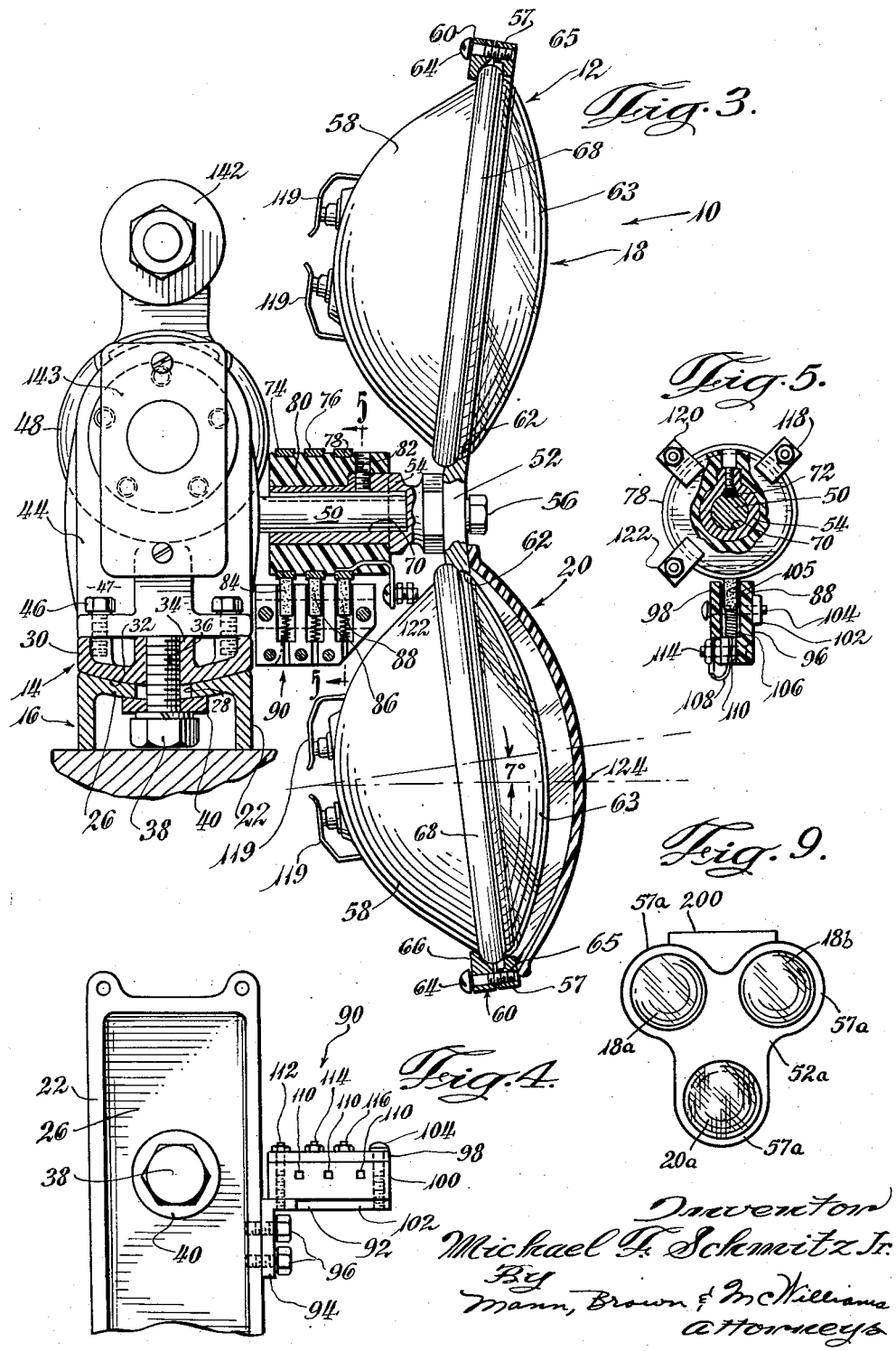

Feb. 11, 1958   M. F. SCHMITZ, JR   2,823,366
ROTATING SIGNAL LIGHT
Filed Feb. 7, 1956   3 Sheets-Sheet 3
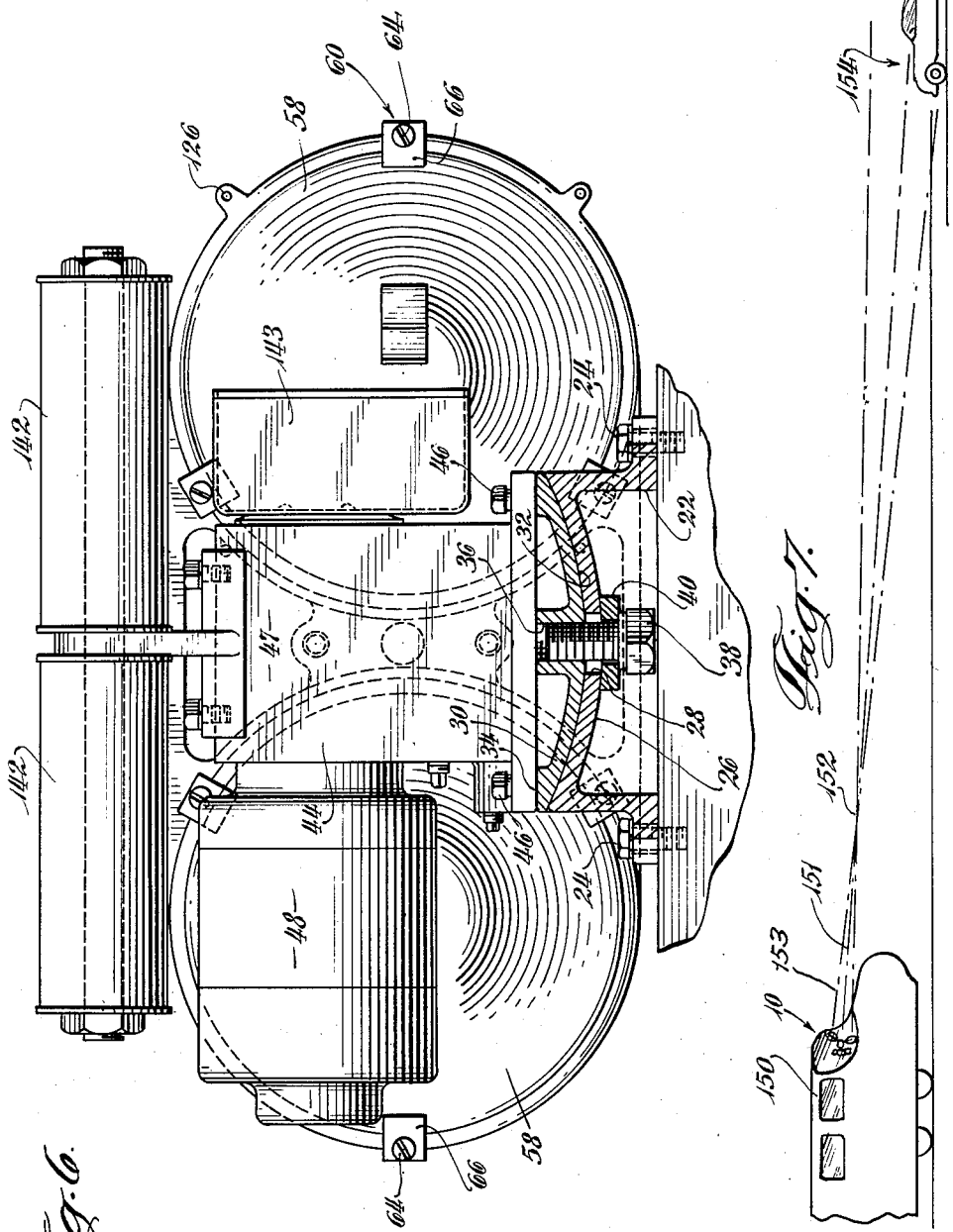
Inventor
Michael F. Schmitz Jr.
By Mann, Brown & McWilliams
Attorneys United States Patent Office 2,823,366
Patented Feb. 11, 1958

2,823,366

ROTATING SIGNAL LIGHT

Michael F. Schmitz, Jr., Lamont, Ill.

Application February 7, 1956, Serial No. 563,936

3 Claims. (Cl. 340—49)

My invention relates to a rotating signal light, and more particularly to a signal light for use as a warning lamp on moving railroad trains and other wheeled vehicles, boats, airplanes, and the like.

Conventional rotating signal lights or lamps used, for instance, on diesel locomotives, are complicated and expensive mechanisms. They normally employ lamps that move through a complicated orbit or path defined by the cooperation of a relatively large number of intricately designed moving parts that are unduly expensive to manufacture, assemble and install. Moreover, the signal provided by these lamps is not always readily observable unless one is relatively close to it, especially during inclement weather at night. This is because the beam or beams of light provided by these signal lamps do not in themselves sufficiently direct attention to the signal lamps, and the mechanisms for rotating same fail to provide this necessary attention attracting quality.

It is a principal object of the present invention to provide a rotating signal light that is composed of a minimum of moving parts, and yet provides an attention attracting signal that is readily detectable from a long distance away.

A further object of the invention is to provide a rotating signal light that provides a circular signal which grows in proportions as the distance from the signal increases.

Another object of the invention is to provide a rotating signal light including a universally tilting adjustment mounting.

Yet another object of the invention is to provide a rotating signal light in which the lamps thereof may be removed for replacement or inspection with heretofore unknown facility in devices of this type.

Still a further object of the invention is to provide a rotating signal light of few and simple parts, which may be manufactured, assembled and installed at low cost, and which provides long and satisfactory service.

In accordance with the principles of my invention, I provide a lamp frame or head mounted for propeller like movement in which the outer ends of the frame or head are inclined to the axis of rotation thereof. One, two or three signal lamps are secured to the frame at said inclined ends, and when the frame is rotated, a circular signal is provided, the diameter of which increases as the distance between the observer and the signal increases. The signal provided is an attention attracting one, and the further away one is from the signal, the larger it appears.

Other objects, uses and advantages will be obvious or become apparent from a consideration of the following description and the drawings.

In the drawings:

Figure 1 is a front elevational view of one form of signal light in which the principles of my invention are embodied;

Figure 2 is a side elevational view of the signal light of Figure 1;

Figure 3 is a view similar to that of Figure 2, but on a larger scale, and with parts shown in section;

Figure 4 is a bottom view of a portion of the signal light mounting base shown in Figure 3;

Figure 5 is a sectional view along line 5—5 of Figure 3, somewhat diagrammatic in layout;

Figure 6 is a rear elevational view of the device shown in Figure 1, on a larger scale and with parts shown in section;

Figure 7 is a diagrammatic view illustrating the operation of the improved signal provided by my light;

Figure 8 is a suggested schematic wiring diagram of a circuit that may be employed in the illustrated embodiment; and Figure 9 is a diagrammatic front elevational view illustrating a modified embodiment of the invention.

Reference numeral 10 of Figs. 1–3 generally indicates one form of my invention including a head or frame or elongate propeller-like member 12 rotatably mounted on a carrier 14 that is adjustably secured to a base 16 which is in turn fixed to the vehicle on which the light is employed. In the illustrated embodiment, the head or frame 12 carries a white lamp 18 and a red lamp 20 which are illuminated when the light 10 is in use to provide a novel warning signal.

The base 16 (see Figure 6) comprises a fixture 22 secured in place by, for instance, bolts 24, and provided with a spherically concave upper wall 26 formed with a perforation 28 at its center. The carrier 14 comprises a platform-like element 30 provided with a lower spherically convex surface 32 adapted to engage the upper surface of wall 26 of fixture 22 and a flat upper end 34. The platform-like element 30 is formed with a screw threaded hole 36 adapted to receive the screw threaded end of bolt 38 that extends through a clamping element 40 positioned below the wall 26 of fixture 22 and through the hole 28 of this fixture. The shank of bolt 38 is preferably somewhat smaller than the diameter of hole 28 to permit adjustment of the carrier 14 with respect to the base 16. It will be noted that these elements provide a universal ball and socket type joint between the base and carrier that permits universal adjustment of the carrier 14 and the elements mounted thereon with respect to the base 16.

A gear reduction unit 44 of suitable construction is mounted on the upper surface 34 of carrier 14 and is secured thereto as by bolts 46. The gear reduction unit comprises a housing 47 to which is secured on one side thereof a motor 48 for rotating the head or frame 12 through suitable gearing mounted in the housing and shaft 50 extending outwardly thereof.

The head or frame 12 comprises a relatively flat plate 52 secured to a hub 54 by bolts 56. The ends 57 of the plate 52 are bent forwardly of the lamp at a slight angle so that the lamps secured thereto will be inclined somewhat. The lamps 18 and 20 are identical and each comprises a conventional seal beam unit 58 secured to the plate 52 as by clamping devices 60. The plate is formed with a large round hole 62 at each end thereof into which the lenses 63 of the respective units 58 are inserted. Each end 57 of plate 52 is formed with three screw threaded holes 65 about the perforations 62 adapted to receive the screw threaded ends of bolts 64 that draw clamping lugs or elements 66 against the outwardly projecting rim 68 of the units 58. It will be noted that the sealed beam units are applied to and removed from the rear of frame or head 12, which avoids having to mount the signal light on a tilting platform or support. In conventional signal lights the sealed beam units are applied from the front of the signal, and this requires that the light be tilted backwardly out of the light pocket for replacement of the beam units.

The hub 54 is formed with a circular recess 70 adapted to receive the end of shaft 50, a key 72 (see Figure 5) of any suitable design being interposed between the hub and shaft. Three spaced apart slip rings 74, 76, and 78 (see Figure 3) are mounted on the insulating element 80 that is received over the hub 54 and secured thereto by set screw 82. The insulating element 80 may be formed from molded plastic or other suitable substances that will insulate the slip rings from each other. The slip rings respectively cooperate with brushes 84, 86 and 88 mounted in a brush holder 90 secured to the carrier 14.

The brush holder 90 comprises an L-shaped angle member 92 (see Figure 4) having the shorter side 94 thereof secured to the carrier 14 as by bolts 96. A pair of insulating brush mounting plates 98 and 100 are secured to the longer side 102 of member 92 by bolts 104. The plate 98 is comparatively flat while the plate 100 is somewhat thicker and is formed with three recesses 105 in which the individual brushes are slidably mounted. The bolts 104 secure these plates together. A spring 106 is mounted under each brush to urge it into engagement with its slip ring, a lead 108 extending between each brush through a relatively small hole 110 formed in the plate 100 below each recess to the respective brush terminals 112, 114 and 116 that are carried by the plate 100. Suitable leads may be connected to the brush terminals to incorporate the lamps in the circuit diagrammatically illustrated in Figure 8. The respective slip rings are provided with terminals 118, 120 and 122 (see Figure 5) which are connected by suitable leads to the terminals 119 of the two lamps. In the illustrated embodiment, the ring 74 is electrically connected to both lamps, the ring 76 is connected to the white lamp 18, and the ring 78 is connected to the red lamp 20. A red filter element 124 secured over lamp 20 by screws 126 (see Figure 1) received in the plate 52 renders the lamp 20 a red light.

As shown in the schematic wiring diagram of Figure 8, the ring 74 is common to both lamps, a lead 128 from a source of electrical energy being connected to a voltage dropping resistance 130, interposed in the line, and the brush 84 which is in contact with the ring 74. The rings 76 and 78 are respectively connected to terminals 132 and 134 of a switch 136 that may be located, for instance, in the cab of a diesel locomotive in the nose of which signal 10 is mounted, which switch is connected to the source of electrical energy by a lead 135 to complete the circuit. The motor 48, which may be of any suitable type, is connected across the line; a switch 138, preferably mounted adjacent the switch 136, and, for instance, in the diesel locomotive cab, controls the operation of the motor. As indicated in Figure 8, the ring 78 may be insulated along a portion of its periphery, as at 140, to provide a blinking effect when the red lamp is on.

The resistors may be mounted in the resistor housings 142 secured to the gear reducer housing where shown and the leads from brush terminals 118, 120 and 122 preferably extend to a connector box 143 also secured to the same housing. The motor connections and leads to the locomotive cab and source of electrical energy may also terminate in this connector box.

When switches 136 and 138 are closed, the plate 52 is rotated by motor 48 and provides a circular light as one of the lamps 18 or 20 will be illuminated. As indicated in Figure 3, the beams emitted by either lamp are directed toward the axis of rotation of the plate 52 and cross same relatively close to the signal light. The plate 52 comprising the head or frame 12 preferably rotates sufficiently fast, for instance, sixty revolutions per minute, to provide a circular signal that grows in diameter the further away from the rotating signal 10 that it is seen. This is because the beams of the respective lamps cross the axis of rotation, as indicated diagrammatically in Figure 7.

As shown in Figure 7, the signal light 10 may be mounted in the front of a locomotive 150 with the axis of rotation 151 of head or frame 12 substantially horizontally disposed (Figure 7 illustrates it downwardly inclined slightly, but it could be horizontal or upwardly inclined slightly, as desired to suit conditions). The beams of light 153 from the respective lamps tend to cross the axis of rotation (and the path of each crosses the other in the illustrated embodiment) at 152 and then diverge away from the axis of rotation to provide a circular signal that grows in diameter the further an observer, positioned, for instance, in auto 154, is located from the signal.

When the switch 136 is in contact with terminal 132, the white lamp 18 is illuminated through the brush 86, ring 76, brush 84 and ring 74. When the switch 136 is in contact with terminal 134, the red lamp 20 is illuminated through the brush 88, ring 78, brush 84 and ring 74.

The signal light 10 is designed to run from a sixty-four volt direct current power supply with the lamps 18 and 20 rated at 32 volts each and the motor 48 comprising a one sixth horsepower shunt wound direct current motor; the reduction gearing rotates shaft 50 at sixty revolutions per minute.

While a two lamp signal is illustrated, I contemplate that a three lamp signal may be provided by making plate 52 into the form of a three armed spider element and electrically connecting the third sealed beam unit in series with one of the units 58. This is diagrammatically illustrated in Figure 9 wherein reference numeral 52a indicates the spider element including bent ends 57a in which lamps 18a, 18b, and 20a are mounted, and reference numeral 200 indicates the diagrammatically illustrated lead that connects lamps 18a and 18b in series. The spider element 52a and its associated elements are otherwise the same as described above.

It will be appreciated that the signal 10 is composed of a minimum of rotating parts and of few and simple elements. It may be inexpensively manufactured, assembled and installed, and yet provides a novel and striking signal, the elevation and inclination of which may be readily adjusted by the universal joint employed in its mounting. Once mounted in the desired position, it need not be moved since the sealed beam units may be removed without moving the signal out of its operating position. This eliminates the problem of unfocused signals that so frequently occur when untrained help change the beam units of conventional signals.

The foregoing description and the drawings are given merely to explain and illustrate my invention, and the invention is not to be limited thereto, except insofar as the appended claims are so limited since those skilled in the art who have my disclosure before them will be able to make modifications and variations therein without departing from the scope of the invention.

I claim:

1. A signal light for use on wheeled vehicles and the like comprising a base member secured to the vehicle, a carrier supported on said base member, releasable ball and socket clamping means securing said carrier to said base member, a gear reduction unit secured to said carrier, a motor secured to said gear reduction unit for driving same, a generally horizontally disposed shaft carried by said reduction unit and rotated by said motor through said reduction unit, a head member disposed in a substantially vertical plane and keyed to said shaft, said head member including a plurality of portions projecting outwardly of said shaft and angled at least at their ends substantially the same amount in a direction forwardly of the vehicle, a sealed beam lamp secured to each of said ends for projecting a light ray in a path that is generally perpendicular to the plane of the respective ends, whereby the light rays emitted by the respective lamps are directed to and intersect the axis of rotation of said shaft and then diverge from said axis of rotation in a forward direction, and electrical connector means including slip ring means rotatable with said shaft for electrically connecting said lamps to a source of electrical energy.

2. The signal light set forth in claim 1 including a plurality of clamping devices for securing the respective lamps to said head member ends, said clamping devices each comprising clamping lug and rearwardly extending clamping screw means screw-threadedly received in said lug and a head member end for drawing said lug against a lamp and thereby clamping the lamp between the lug and the head member end, whereby said lamps may be applied to and removed from the rear of said head member.

3. A rotating signal lamp for mounting in the nose of a railroad locomotive or the like comprising a base, a signal lamp carrier mounted on said base for limited universal joint like adjustment, means for releasably clamping said carrier to said base, a generally vertically disposed head member carried by said carrier for rotation about a substantially horizontal axis passing through its center, said head member comprising a plurality of end portions angled forwardly of the locomotive, a sealed beam lamp carried by each of said end portions, and a plurality of clamping devices securing the respective lamps to the respective end portions from the rear of said head member, said clamping devices each comprising lug means and screw-threaded means for drawing said lug means against the respective lamps to clamp same to the rear of said head member, connector means electrically connecting said lamps to a source of electrical energy, and motor means for rotating said head member.

References Cited in the file of this patent

UNITED STATES PATENTS

| 704,513   | Campbell       | July 12, 1902 |
| 1,017,368 | Bartley        | Feb. 13, 1912 |
| 1,126,486 | Knight         | Jan. 26, 1915 |
| 1,344,084 | Hackett        | June 22, 1920 |
| 1,772,499 | Rumsey         | Aug. 12, 1930 |
| 1,960,534 | Gibney         | May 29, 1934 |
| 2,210,718 | Henninger et al.| Aug. 6, 1940 |
| 2,677,121 | Heehler        | Apr. 27, 1954 |